United States Patent
Uno et al.

(10) Patent No.: US 10,804,828 B2
(45) Date of Patent: Oct. 13, 2020

(54) GENERATOR CONTROLLER

(71) Applicant: Mitsubishi Electric Corporation, Tokyo (JP)

(72) Inventors: Norifumi Uno, Tokyo (JP); Masahiro Nakajima, Tokyo (JP); Keisuke Katsurada, Tokyo (JP); Junya Sasaki, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 16/399,205

(22) Filed: Apr. 30, 2019

(65) Prior Publication Data

US 2019/0393815 A1 Dec. 26, 2019

(30) Foreign Application Priority Data

Jun. 25, 2018 (JP) .................................. 2018-119475

(51) Int. Cl.
*H02P 9/00* (2006.01)
*H02P 9/30* (2006.01)
*H02P 9/48* (2006.01)
*H02P 101/45* (2016.01)

(52) U.S. Cl.
CPC .............. *H02P 9/305* (2013.01); *H02P 9/48* (2013.01); *H02P 2101/45* (2015.01)

(58) Field of Classification Search
CPC .......... H02P 1/02; H02P 2101/45; H02P 9/08; H02P 9/305; H02P 9/48
USPC .................................................... 322/28, 24
See application file for complete search history.

(56) References Cited

U.S. PATENT DOCUMENTS

| | | | | |
|---|---|---|---|---|
| 5,115,183 A * | 5/1992 | Kyoukane | ............. | B60W 10/26 320/123 |
| 5,880,577 A * | 3/1999 | Aoyama | ............... | H02J 7/1446 322/29 |
| 7,268,441 B2 * | 9/2007 | Asao | ........................ | H02P 9/305 318/400.09 |
| 7,362,002 B2 * | 4/2008 | Kuribayashi | ........... | F02N 11/04 290/31 |
| 8,773,081 B2 * | 7/2014 | Akita | ...................... | H02P 9/305 322/22 |

(Continued)

FOREIGN PATENT DOCUMENTS

JP          2012-125105 A          12/2010

*Primary Examiner* — Julio C. Gonzalez
(74) *Attorney, Agent, or Firm* — Sughrue Mion, PLLC; Richard C. Turner (57) ABSTRACT

To provide a generator controller can determine permission of power generation autonomously within a range where startability is not deteriorated, even in the case where the generator controller cannot communicate with the engine controller. A generator controller, in case of communication normal time with engine controller, permits the generation voltage control when the permission command signal is received from the engine controller and the generator rotational speed is higher than a determination value at communication normal time, and prohibits the generation voltage control at other times; in the case of communication failure time, permits the generation voltage control when the generator rotational speed is higher than a determination value at communication failure time, and prohibits the generation voltage control at other times.

7 Claims, 6 Drawing Sheets

(56) References Cited

U.S. PATENT DOCUMENTS

| | | | | |
|---|---|---|---|---|
| 9,194,488 B2* | 11/2015 | Nakamura | ............... | F02D 29/06 |
| 2006/0006655 A1* | 1/2006 | Kanazawa | ............ | H02J 7/1492 |
| | | | | 290/40 B |
| 2006/0267344 A1* | 11/2006 | Kuribayashi | ............ | F02N 11/04 |
| | | | | 290/31 |
| 2007/0013262 A1* | 1/2007 | Okumoto | ............... | H02K 19/34 |
| | | | | 310/263 |
| 2008/0191482 A1* | 8/2008 | Okuno | ....................... | H02P 9/48 |
| | | | | 290/7 |
| 2019/0162153 A1* | 5/2019 | Kajiwara | ............... | B60W 10/08 |

* cited by examiner

GENERATOR CONTROLLER

INCORPORATION BY REFERENCE

The disclosure of Japanese Patent Application No. 2018-119475 filed on Jun. 25, 2018 including its specification, claims and drawings, is incorporated herein by reference in its entirety.

BACKGROUND

The present disclosure relates to a generator controller which controls a generator generating electricity by a rotational driving force of an engine.

If a cranking motor is energized in order to start the engine after a system power source is turned on, the voltage of the battery drops since the cranking motor consumes a large current. Therefore, it is desired to generate electricity by the generator and raise the power source voltage. However, if the power generation of the generator is started before the engine combustion is stabilized and the engine rotational speed rises after start of the engine starting by the cranking motor, the engine output torque is taken by the generator, and there is a possibility that the engine rotational speed drops and the engine startability is deteriorated.

JP 2012-125105 A discloses the technology that in order to determine the power generation start timing of the generator with good accuracy even if ripple occurs in engine rotational speed during the engine starting, the power generation is started when the minimum value of rotational speed becomes greater than or equal to the determination value during the period greater than or equal to the pulsation period.

SUMMARY

However, in the technology of JP 2012-125105 A, there was a problem that if the period greater than or equal to the pulsation period does not elapse after the rotational speed rises, the power generation cannot be started, and the start timing of the power generation is delayed. And, in the case where the pulsation period becomes long by external factors such as the engine aging change, the power generation is started before the rotational speed rises enough, and there is a possibility that the engine startability is deteriorated.

By the way, the engine controller can detect the behavior of the rotational speed of the engine after start of the engine starting with high precision using the output signal of the crank angle sensor. Therefore, it can be considered that the engine controller determines permission or prohibition of the power generation based on the behavior of engine rotational speed and transmits to the generator controller, and the generator controller starts the power generation according to the command signal of that engine controller.

However, it is considered the case where the generator controller cannot communicate with the engine controller by some factor. The technology of JP 2012-125105 A is not configured considering the communication with the engine controller, and does not consider to start the power generation appropriately at the communication normal time and the communication failure time.

Thus, it is desirable to provide a generator controller that can determine permission of the power generation autonomously so that the power generation is started as soon as possible within a range where startability is not deteriorated after the system power source is turned on, even in the case where the generator controller cannot communicate with the engine controller.

A generator controller which controls a generator generating electricity by a rotational driving force of an engine, the generator controller according to the present disclosure includes:

a communication unit that receives a command signal of permission or prohibition of a generation voltage control from an engine controller which controls the engine;

a rotational speed detection unit that detects a rotational speed of the generator;

a generation permission determination unit that in a case where the communication unit can communicate with the engine controller after a system power source is turned on, permits the generation voltage control when the command signal of permission of the generation voltage control is received from the engine controller and the rotational speed of the generator is higher than a determination value at communication normal time, and prohibits the generation voltage control when the command signal of prohibition of the generation voltage control is received from the engine controller or when the rotational speed of the generator is lower than the determination value at communication normal time, and in a case where the communication unit cannot communicate with the engine controller after the system power source is turned on, permits the generation voltage control when the rotational speed of the generator is higher than a determination value at communication failure time which is set to a value higher than the determination value at communication normal time, and prohibits the generation voltage control when the rotational speed of the generator is lower than the determination value at communication failure time; and a field current control unit that in a case where the generation permission determination unit permits the generation voltage control, performs the generation voltage control which controls on/off of energization to a field winding of the generator so that the generation voltage of the generator approaches a target voltage, and in a case where the generation permission determination unit prohibits the generation voltage control, stops the generation voltage control.

According to this generator controller, in the case where the communication unit receives the command signal from the engine controller, the generation permission determination unit determines permission or prohibition of the generation voltage control basically according to the command signal of permission or prohibition of the engine controller. Therefore, after the system power source is turned on and the engine starting by the cranking motor starts, by following the command signal of the engine controller which can determine the engine combustion state with better accuracy, the generation voltage control can be started in an early stage within a range where the startability is not deteriorated. But, even in the case where the command signal of permission is received from the engine controller, there is a case where it can be determined that startability is deteriorated if following the command signal. Then, even in the case where the command signal of permission is received from the engine controller, when the rotational speed of the generator is lower than the determination value at communication normal time, deterioration of startability can be suppressed by determining prohibition of the generation voltage control.

On the other hand, in the case where the communication unit cannot receive the command signal from the engine controller, by permitting the generation voltage control based on the rotational speed of the generator, the generator controller can permit the generation voltage control autonomously. However, it is not easy to determine combustion stability of the engine after start of the engine starting with high precision by the rotational speed of the generator, compared with the engine controller. Therefore, the determination value at communication failure time is set to a value higher than the determination value at communication normal time, and is set to the safe side which erroneous determination does not cause easily. Therefore, also in the case of the communication failure, the generation voltage control can be started as soon as possible within a range where startability is not deteriorated after start of the engine starting by the cranking motor.

DETAILED DESCRIPTION OF THE EMBODIMENTS

1. Embodiment 1

Figure 1:
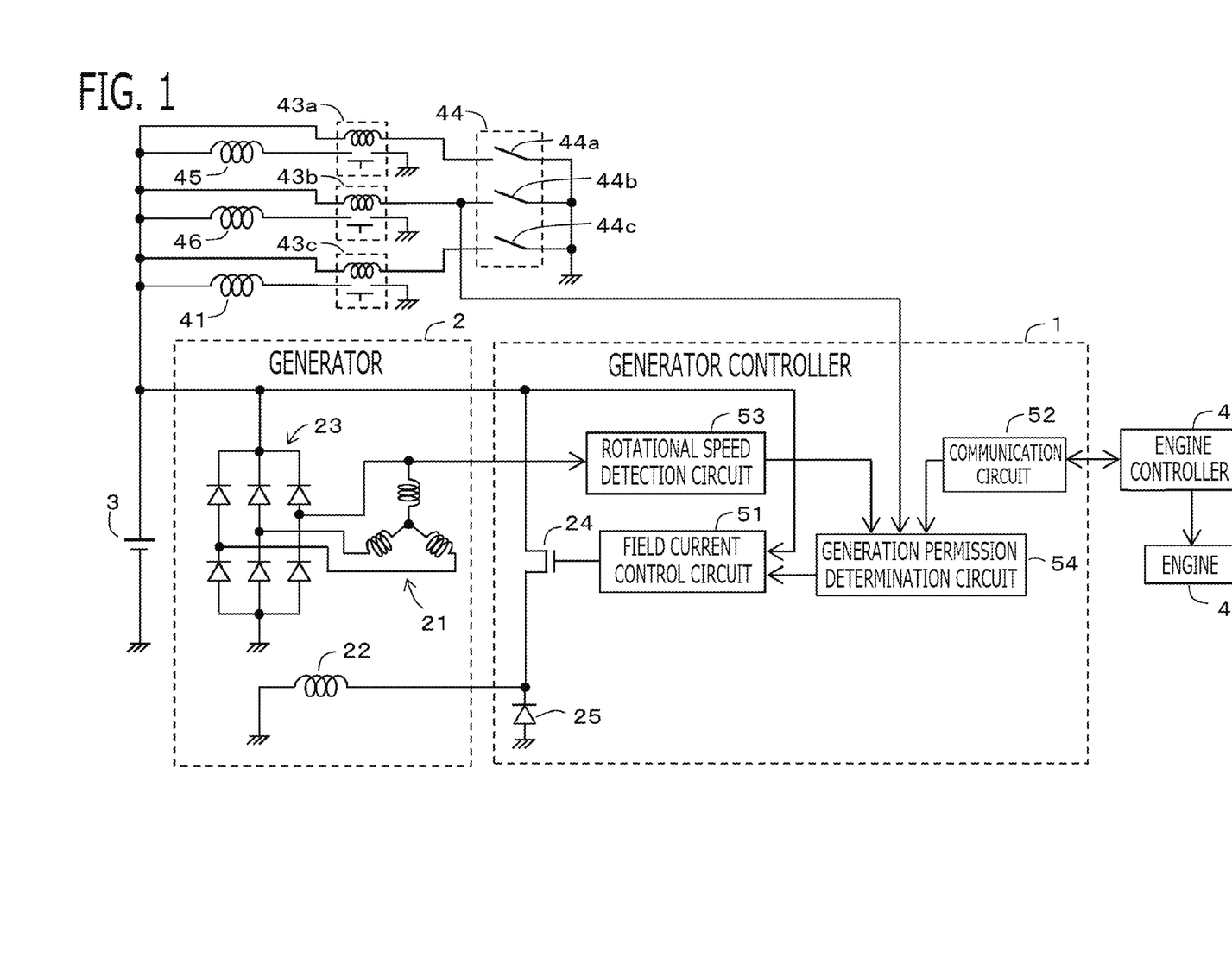
FIG. 1 is a schematic configuration diagram of the generator, the generator controller, and the engine according to Embodiment 1.

A generator controller 1 which controls a generator 2 according to Embodiment 1 will be explained with reference to drawings. FIG. 1 is a schematic configuration diagram of the generator 2, the generator controller 1, an engine 4, a cranking motor 41, and an engine controller 42. These are mounted in a vehicle, and the engine 4 is use as a driving force source of wheels.

An ignition switch 44 is provided in the vehicle. When a driver sets the ignition switch 44 to an accessory position, the accessory power switch 44a is turned on, thereby, an accessory power source relay 43a is turned on, and power is supplied to the accessory equipment 45, such as an audio. When the driver sets the ignition switch 44 to an ignition position, the system power source switch 44b is turned on in the state where the accessory power switch 44a is turned on, thereby, the system power source relay 43b is turned on, and power is supplied to each unit of a vehicle system 46 including the generator controller 1, the engine 4, the engine controller 42, and the like. When the driver sets the ignition switch 44 to a cranking motor drive position, a cranking motor power switch 44c is turned on in the state where the accessory power switch 44a and the system power source switch 44b are turned on, thereby, the starter relay 43c is turned on, and power is supplied to the cranking motor 41.

1-1. Configuration of Generator 2

The generator 2 generates electricity by the rotational driving force of the engine 4. A rotary shaft of the generator 2 is connected with a crankshaft of the engine 4 via a connecting mechanism, such as a pulley and belt mechanism. Three-phase windings 21 is provided in a stator of the generator 2, and a field winding 22 is provided in a rotor. The three-phase windings 21 are connected by star connection. The generator 2 is provided with a rectifier circuit 23 which rectifies the three-phase alternating voltages outputted from the three-phase windings 21, and converts into DC voltage. The rectifier circuit 23 is a three-phase full-wave diode rectification circuit provided with three sets of two diodes connected in series. A connection node of two diodes of each phase is connected to the winding of each phase. A positive electrode side terminal of the rectifier circuit 23 is connected to a positive electrode side of a DC power sources 3, such as a battery, and a negative electrode side terminal of the rectifier circuit 23 is connected to a negative electrode side (ground) of the DC power source 3. A voltage of the positive electrode side terminal of the rectifier circuit 23 becomes a generation voltage of the generator 2, and becomes a power source voltage.

The field winding 22 is connected in series to the DC power source 3 via a switching device 24. If the ON period of the switching device 24 increases, the current which flows into the field winding 22 increases, the generation power of the generator 2 increases, and the power source voltage increases. On the other hand, if the ON period of the switching device 24 decreases, the current which flows into the field winding 22 decreases, the generation power of the generator 2 decreases, and the power source voltage decreases. If the ON period of the switching device 24 increases, the regenerative torque increases, and the load torque transmitted to the engine 4 becomes large.

MOSFET (Metal Oxide Semiconductor Field Effect Transistor), IGBT (Insulated Gate Bipolar Transistor), or the like is used for the switching devices 24. The gate terminal of the switching device 24 is connected to a field current control circuit 51. A reflux diode 25 is connected in parallel with the field winding 22, and when the switching device 24 is off, current which flows into the field winding 22 is refluxed.

1-2. Configuration of Engine 4

The engine 4 is an internal combustion engine, such as a gasoline engine or a diesel engine. The engine 4 has the cranking motor 41. The cranking motor 41 is a motor which rotates the engine 4. A pinion gear provided in the output shaft of the cranking motor 41 engages with a ring gear which rotates integrally with a crankshaft of the engine 4. When the ignition switch 44 is set to the cranking motor drive position by the driver and the starter relay 43c is turned on, the DC power is supplied to the cranking motor 41 from the DC power source 3. By the rotational driving force of the cranking motor 41, the engine rotational speed rises from zero and rotates at the cranking rotational speed. The engine controller 42 starts fuel injection control and ignition control, when the engine 4 starts to rotate. When combustion of the engine 4 starts, the engine rotational speed rises from the cranking rotational speed, and start of the engine 4 is completed.

Since the cranking motor 41 consumes large current, the battery voltage drops. Therefore, it is desired to make the generator 2 generate electricity and increase the power source voltage. However, since combustion is unstable during start of the engine 4, when the generator 2 is made to generate electricity and the load torque becomes large, the engine rotational speed drops and startability is deteriorated.

<Engine Controller 42>

The engine controller 42 can detect behavior of the rotational speed of the engine after start of the engine starting with high precision. For example, the engine controller 42 can obtain the information on engine rotational speed using the output signal of the crank angle sensor at every time the crankshaft rotates from several degrees to several tens degrees. The engine controller 42 can determine combustion stability of the engine after start of the engine starting based on behavior of the engine rotational speed. Then, the engine controller 42 determines permission or prohibition of a generation voltage control based on behavior of the rotational speed of the engine 4, after start of the engine starting by the cranking motor 41, and transmits the determination result to the generator controller 1 as the command signal. For example, when the engine rotational speed exceeds a determination rotational speed and a fluctuation range of the engine rotational speed becomes less than or equal to a determination width, the engine controller 42 determines that combustion was stabilized, and determines to permit the generation voltage control.

1-3. Configuration of Generator Controller 1

The generator controller 1 is provided with a field current control unit, a communication unit, a rotational speed detection unit, and a generation permission determination unit. In the present embodiment, as shown in FIG. 1, the field current control unit is configured by a field current control circuit 51, the communication unit is configured by a communication circuit 52, the rotational speed detection unit is configured by a rotational speed detection circuit 53, and the generation permission determination unit is configured by a generation permission determination circuit 54. The field current control circuit 51, the rotational speed detection circuit 53, and the generation permission determination circuit 54 are configured by various kinds of electronic circuits, such as a comparator, an operational amplifier, a differential amplifying circuit, a logical circuit, an IC (Integrated Circuit), and an ASIC (Application Specific Integrated Circuit).

1-3-1. Field Current Control Circuit 51

In the case where the generation permission determination circuit 54 permits the generation voltage control, the field current control circuit 51 performs the generation voltage control which controls on/off of the energization to the field winding 22 so that the generation voltage of the generator 2 approaches a target voltage (for example, 14V); and in the case where the generation permission determination circuit 54 prohibits the generation voltage control, the field current control circuit 51 stops the generation voltage control.

In the present embodiment, the field current control circuit 51 is connected to the positive electrode side terminal of the rectifier circuit 23. The field current control circuit 51 detects the generation voltage (the power source voltage) of the generator 2 by a potential of the positive electrode side terminal of the rectifier circuit 23. The field current control circuit 51 generates a gate driving signal which turns on and off the switching device 24 by PWM (Pulse Width Modulation) control. The gate driving signal is inputted to the gate terminal of the switching device 24. In the PWM control, an ON duty ratio of pulse wave with a preliminarily set PWM control period is changed. When performing the generation voltage control, the field current control circuit 51 performs feedback control that increases the ON period (the ON duty ratio) of the switching device 24 in the case where the generation voltage is lower than the target voltage, and decreases the ON period (the ON duty ratio) of the switching device 24 in the case where the generation voltage is higher than the target voltage.

In the present embodiment, the field current control circuit 51 performs an energization stop to the field winding 22 or an initial excitation control, in the case where the generation permission determination circuit 54 prohibits the generation voltage control. Switching processing between an execution determination of the energization stop to the field winding 22 and an execution determination of the initial excitation control in the generation permission determination circuit 54 is described below.

In the case where the generation permission determination circuit 54 determines to perform the energization stop to the field winding 22, the field current control circuit 51 sets the ON period of the switching device 24 to 0, and always turns off the switching device 24. Since there is residual flux in the core of the rotor also when stopping the energization to the field winding 22, a minute induced voltage (the generation voltage) is generated in the three-phase windings 21 according to rotation of the rotor. By detecting this minute generation voltage, the rotational speed can be detected. However, the residual flux may be varied with the core temperature and the like. Therefore, in order to detect the rotational speed more certainly, the initial excitation control is performed. In the case where the generation permission determination circuit 54 determines to perform the initial excitation control, the field current control circuit 51 sets the ON period (the ON duty ratio) of the switching device 24 to a preliminarily set initial excitation value. The initial excitation value is set to a small value (for example, the ON duty ratio less than or equal to 5%) to make the regenerative torque small.

1-3-2. Rotational Speed Detection Circuit 53

The rotational speed detection circuit 53 detects a rotational speed of the generator. In the present embodiment, the rotational speed detection circuit 53 is connected to any one phase winding of the three-phase windings 21. The rotational speed detection circuit 53 generates a pulse signal by comparing the potential of the output terminal of one phase winding with a preliminarily set potential, and detects the rotational speed of the generator based on period of the pulse signal.

The rotational speed of the generator is proportional to the engine rotational speed. Although it depends on a pole number of the electromagnet of the rotor, the rotational speed of the generator is detected at every AC period of one phase of the windings 21. Accordingly, the detection period of the rotational speed of the generator detected by the rotational speed detection circuit 53 becomes longer than the detection period of the rotational speed of the engine detected by the engine controller 42. Since the rotational speed detection circuit 53 cannot obtain information on absolute angle of the crankshaft, it cannot associate information on the rotational speed of the generator with information on combustion cylinder and piston position of the engine. Therefore, it is not easy to determine combustion stability of the engine after start of the engine starting with high precision by the rotational speed of the generator detected by the rotational speed detection circuit 53, compared with the engine controller 42.

1-3-3. Communication Circuit 52

The communication circuit 52 is a circuit which communicates with the engine controller 42, and receives the command signal of permission or prohibition of the generation voltage control from the engine controller 42. In the present embodiment, the communication circuit 52 performs data communication with the engine controller 42 based on the communications protocol (in this example, LIN (Local Interconnect Network)) via the communication wire.

However, there is a case where the communication circuit 52 cannot communicate with the engine controller 42 by some factor. For example, since a drop of the power source voltage is large and a noise component becomes large after start of the engine starting by the cranking motor, there is a case where the communication cannot be performed normally. Or, there is a case where the communication wire was cut off. Also in the case of this communication failure, it is desired that the generator controller 1 determines permission of the generation voltage control autonomously, so that the generation voltage control is started as soon as possible within a range where startability is not deteriorated after start of the engine starting by the cranking motor.

1-3-4. Generation Permission Determination Circuit 54

<Energization Stop State ST1>

Figure 2:
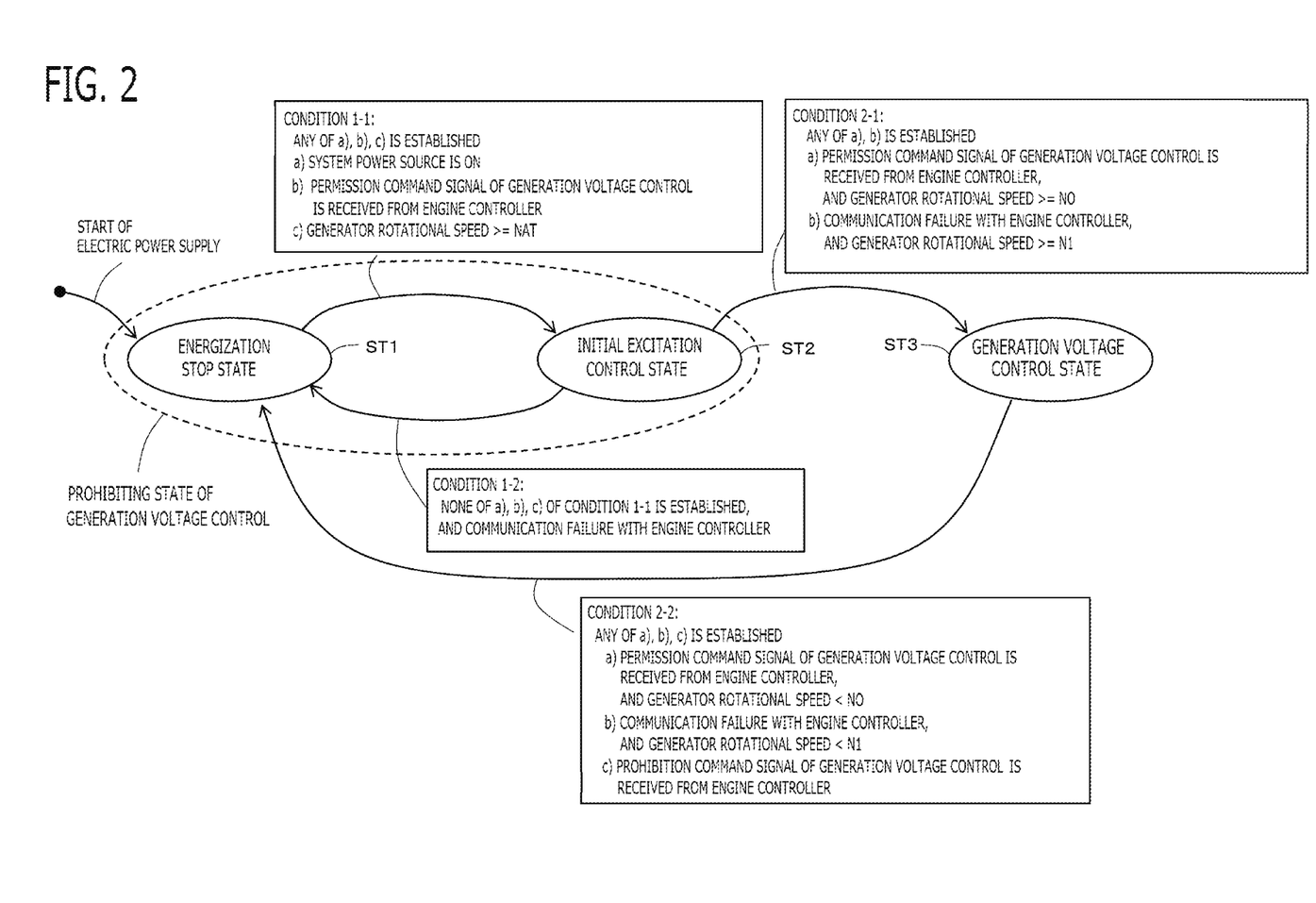
FIG. 2 is a state transition diagram for explaining the processing of the generator controller according to Embodiment 1.

As shown in the state transition diagram of FIG. 2, the generation permission determination circuit 54 transits to an energization stop state ST1 that determines to perform the energization stop to the field winding 22 as an initial state after start of the electric power supply. In the energization stop state ST1, the generation permission determination circuit 54 commands the field current control circuit 51 to perform the energization stop. Then, the field current control circuit 51 stops the energization to the field winding 22, as mentioned above.

<Initial Excitation Control State ST2>

In a case where a condition 1-1 is established in the energization stop state ST1, the generation permission determination circuit 54 transits to an initial excitation control state ST2 that determines to perform the initial excitation control. In the initial excitation control state ST2, the generation permission determination circuit 54 commands the field current control circuit 51 to perform the initial excitation control. Then, the field current control circuit 51 performs the initial excitation control, as mentioned above. Herein, the energization stop state ST1 and the initial excitation control state ST2 are a state prohibiting the generation voltage control.

The condition 1-1 consists of a) the system power source is ON, b) the communication circuit 52 can communicate with the engine controller 42, and receives the command signal of permission of the generation voltage control from the engine controller 42, and c) the rotational speed of the generator is greater than or equal to an auto cut-in determination value NAT; and the condition 1-1 is established in a case where any of a), b), c) is established.

In the present embodiment, the on-off information on the system power source switch 44b of the ignition switch 44 (in this example, the terminal voltage) is inputted into the generation permission determination circuit 54 (refer to FIG. 1). When the system power source switch 44b is turned on (in this example, when the terminal voltage of the system power source switch 44b becomes Low), the generation permission determination circuit 54 determines that the system power source is turned on; and when the system power source switch 44b is turned off (in this example, when the terminal voltage of the system power source switch 44b becomes High), the generation permission determination circuit 54 determines that the system power source is turned off.

The conditions of b) and c) of the condition 1-1 are provided so as to transit from the energization stop state ST1 to the initial excitation control state ST2 and transit to the generation voltage control state ST3 for failsafe, even in a case where it cannot be determined whether or not the system power source is ON, due to disconnection of the signal wire which inputs the on-off information on the system power source switch 44b into the generation permission determination circuit 54. That is to say, even in the case where it is determined that the system power source is OFF due to the disconnection and the like, when b) or c) of the condition 1-1 is established, it transits from the energization stop state ST1 to the initial excitation control state ST2. The auto cut-in determination value NAT is preliminarily set to a value higher than a determination value at communication failure time N1 described below. For example, the auto cut-in determination value NAT is set to a rotational speed higher than the rotational speed of the generator corresponding to an idling rotational speed of the engine, so as to prevent the generation voltage control from not being performed, even after the vehicle starts running.

In a case where the condition 1-2 is established in the initial excitation control state ST2, the generation permission determination circuit 54 transits to the energization stop state ST1. The condition 1-2 is established, in a case where none of a), b), c) of the condition 1-1 is established and the communication circuit 52 cannot communicate with the engine controller 42.

<Generation Voltage Control State ST3>

Then, in a case where the condition 2-1 is established in the initial excitation control state ST2 as the prohibiting state of the generation voltage control, the generation permission determination circuit 54 transits to the generation voltage control state ST3 that determines to perform the generation voltage control. In the generation voltage control state ST3, the generation permission determination circuit 54 commands the field current control circuit 51 to perform the generation voltage control. Then, the field current control circuit 51 performs the generation voltage control, as mentioned above.

The condition 2-1 consists of a) the communication circuit 52 can communicate with the engine controller 42 and receive the command signal of permission of the generation voltage control from the engine controller 42, and the rotational speed of the generator is greater than or equal to a determination value at communication normal time NO, and b) the communication circuit 52 cannot communicate with the engine controller 42, and the rotational speed of the generator is greater than or equal to a determination value at communication failure time N1; and the condition 2-1 is established in a case where any of a), b) is established. Herein, the determination value at communication failure time N1 is set to a value higher than the determination value at communication normal time NO.

On the other hand, in a case where the condition 2-2 is established in the generation voltage control state ST3, the generation permission determination circuit 54 transits to the energization stop state ST1 as the prohibiting state of the generation voltage control.

The condition 2-2 consists of a) the communication circuit 52 can communicate with the engine controller 42 and receives the command signal of permission of the generation voltage control from the engine controller 42, and the rotational speed of the generator is lower than the determination value at communication normal time NO, b) the communication circuit 52 cannot communicate with the engine controller 42, and the rotational speed of the generator is lower than the determination value at communication failure time N1, and c) the communication circuit 52 can communicate with the engine controller 42 and receives the command signal of prohibition of the generation voltage control from the engine controller 42; and the condition 2-2 is established in a case where any of a), b), c) is established.

<Explanation of Processing>

According to the above mentioned configurations, in a case where the communication circuit 52 can communicate with the engine controller 42 after the system power source is turned on, the generation permission determination circuit 54 permits the generation voltage control when the command signal of permission of the generation voltage control is received from the engine controller 42 and the rotational speed of the generator is higher than the determination value at communication normal time NO; and prohibits the generation voltage control when the command signal of prohibition of the generation voltage control is received from the engine controller 42 or when the rotational speed of the generator is lower than the determination value at communication normal time NO.

On the other hand, in a case where the communication circuit 52 can communicate with the engine controller 42 after the system power source is turned on, the generation permission determination circuit 54 permits the generation voltage control when the rotational speed of the generator is higher than the determination value at communication failure time N1, and prohibits the generation voltage control when the rotational speed of the generator is lower than the determination value at communication failure time N1.

Figure 3:
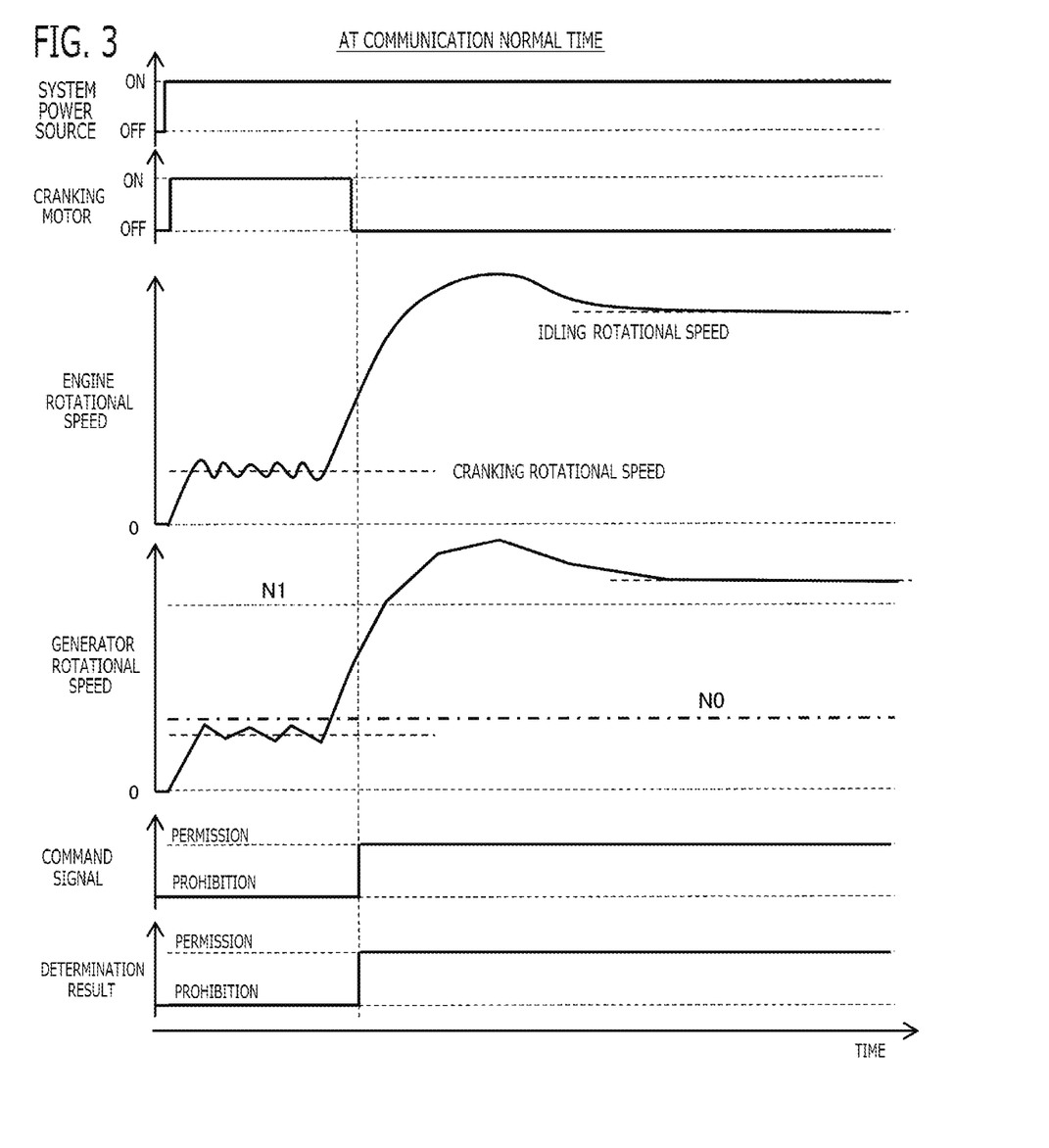
FIG. 3 is a time chart for explaining the control behavior at the communication normal time according to Embodiment 1.

According to this configuration, as shown in the time chart of FIG. 3, in a case where the communication circuit 52 can communicate with the engine controller 42, the generation permission determination circuit 54 determines permission or prohibition of the generation voltage control basically according to the command signal of permission or prohibition of the engine controller 42. Therefore, after the system power source is turned on and the engine starting by the cranking motor starts, by following the command signal of the engine controller 42 which can determine the engine combustion state with better accuracy, the generation voltage control can be started in an early stage within a range where the startability is not deteriorated.

But, even in the case where the communication circuit 52 can communicate with the engine controller 42, there is a case where it can be determined that startability is deteriorated if following the command signal. Then, even in the case where the communication circuit 52 can communicate with the engine controller 42, when the rotational speed of the generator is lower than the determination value at communication normal time NO, deterioration of startability can be suppressed by determining prohibition of the generation voltage control.

In the present embodiment, the determination value at communication normal time NO is preliminarily set to a value according to the rotational speed of the generator corresponding to the cranking rotational speed of the engine by the cranking motor. For example, the determination value at communication normal time NO is set to a value (for example, 800 rpm) higher than the rotational speed of the generator corresponding to the cranking rotational speed by the margin value. In a case where the engine rotational speed is near the cranking rotational speed, when the generation voltage control is started, a possibility that startability is deteriorated is high. Therefore, deterioration of startability can be suppressed more certainly.

Figure 4:
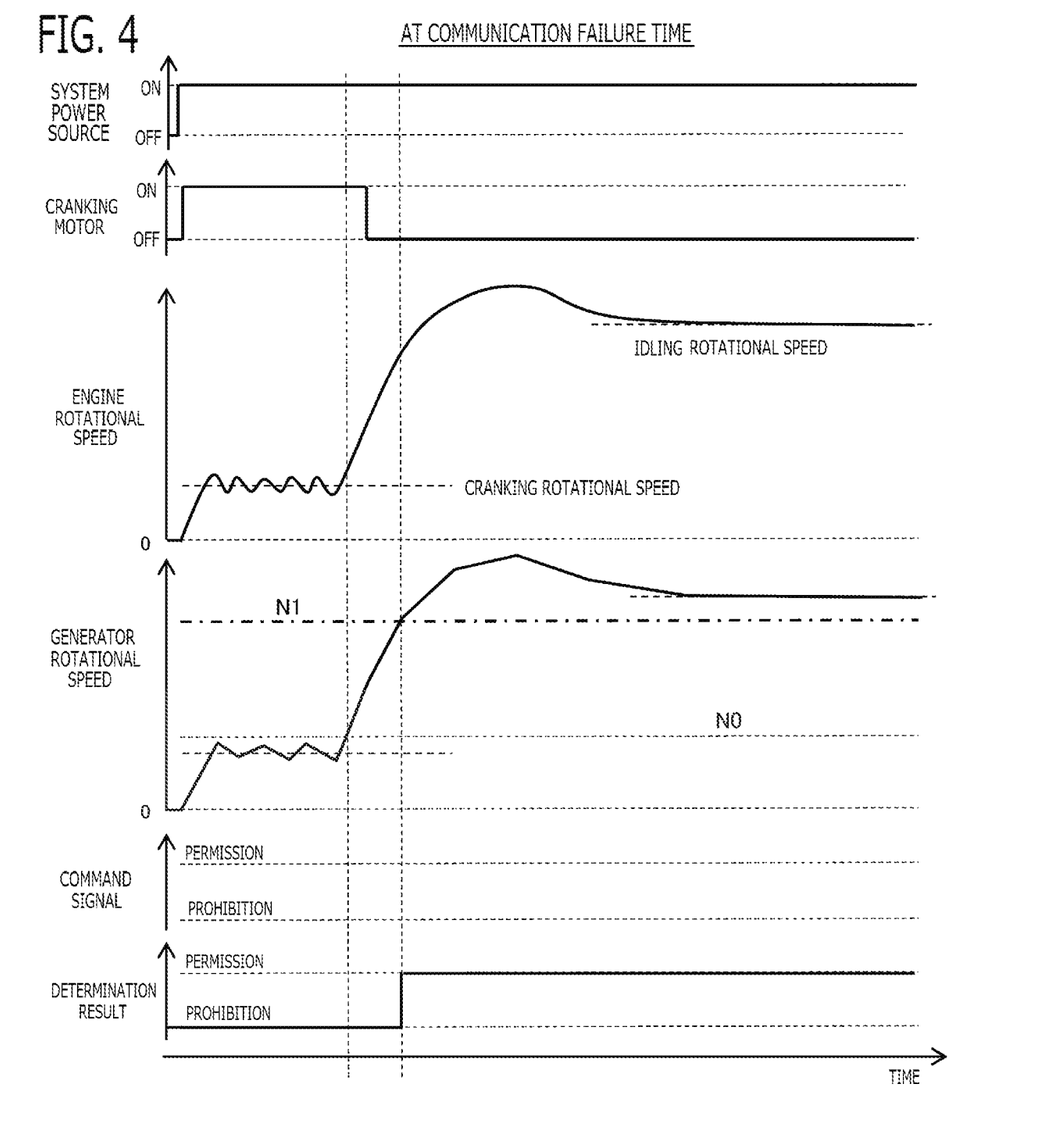
FIG. 4 is a time chart for explaining the control behavior at the communication failure time according to Embodiment 1.

As shown in the time chart of FIG. 4, in the case where the communication circuit 52 cannot communicate with the engine controller 42, by permitting the generation voltage control based on the rotational speed of the generator, the generator controller 1 can permit the generation voltage control autonomously. However, it is not easy to determine combustion stability of the engine after start of the engine starting with high precision by the rotational speed of the generator, compared with the engine controller 42. Therefore, the setting value of the determination value at communication failure time N1 is set to a value higher than the determination value at communication normal time NO, and is set to the safe side which erroneous determination does not cause easily. Therefore, also in the case of the communication failure, the generation voltage control can be started as soon as possible within a range where startability is not deteriorated after start of the engine starting by the cranking motor.

In the present embodiment, the determination value at communication failure time N1 is set to the rotational speed of the generator corresponding to the rotational speed of the engine, which is a value higher than the determination value at communication normal time NO and can be determined that the engine starting was completed. If the engine rotational speed becomes sufficiently higher than the cranking rotational speed, it can be determined that combustion is stable. For example, the determination value at communication failure time N1 is preliminarily set to a value according to the rotational speed of the generator corresponding to the engine idling rotational speed. The determination value at communication failure time N1 is set to a value (for example, 2000 rpm) lower than the rotational speed of the generator corresponding to the engine idling rotational speed by a predetermined value.

By the way, the generation voltage control of the generator is started during energization of the cranking motor 41, after that, if energization of the cranking motor 41 stops, electric load is eliminated at that moment and load dump such as serge occurs. As described above, if the determination value at communication failure time N1 is set to the rotational speed of the generator corresponding to the rotational speed of the engine which can be determined that the engine starting was completed, there is a high probability that energization of the cranking motor 41 stops at the starting point of the generation voltage control of the generator in the case of the communication failure. Therefore, in the case of the communication failure, an occurrence probability of the load dump can be reduced.

Alternatively, as in the case of an idling stop vehicle, a hybrid vehicle, or a start push button type ignition switch, the engine controller 42 may control on/off of the energization to the cranking motor 41 (the starter relay 43c). In this case, in the case where specified condition is established, the engine controller 42 turns on the starter relay 43c, and starts the energization to the cranking motor 41. After that, when the engine rotational speed exceeds a preliminarily set stop rotational speed, the engine controller 42 turns off the starter relay 43c to stop the energization to the cranking motor 41. In this case, the determination value at communication failure time N1 may be preliminarily set to a rotational speed higher than the rotational speed of the generator corresponding to the rotational speed of the engine (stop rotational speed) at which the engine controller 42 turns off the energization to the cranking motor 41. In the case of the communication failure, the occurrence probability of load dump can be reduced more certainly.

According to the configuration of the state transition diagram of FIG. 2, the generation permission determination circuit 54, as an initial processing after start of the electric power supply to the generator controller 1, determines to perform the energization stop to the field winding 22 as the prohibiting state of the generation voltage control; after that, when detecting that the system power source switch 44b of the ignition switch 44 was turned on and determining that the system power source was turned on, the generation permission determination circuit 54 determines to perform the initial excitation control as the prohibiting state of the generation voltage control.

According to this configuration, as the initial processing after start of the electric power supply to the generator controller 1, the generator 2 starts from the energization stop which does not generate electricity actively. Then, since a possibility of starting the engine and starting the generation voltage control becomes high after determining that the system power source was turned on, the initial excitation control, in which the detectability of the rotational speed of the generator becomes more certain without depending on the residual flux, is started; and start determination of the generation voltage control by the rotational speed of the generator can be performed more certainly. Since the regenerative torque which occurs in the initial excitation control is small, engine startability is not deteriorated.

In the case where the signal wire, which inputs the on-off information (potential) of the system power source switch 44b into the generation permission determination circuit 54, does not disconnect, after the system power source switch 44b is turned on and the electric power supply to the generator controller 1 starts, it is immediately determined that the system power source is on, and the initial excitation control is started. That is to say, at the normal time of the signal wire of the system power source switch 44b, the initial excitation control is performed as the prohibiting state of the generation voltage control.

In the case where the communication circuit 52 cannot communicate with the engine controller 42, when the rotational speed of the generator becomes lower than the determination value at communication failure time N1 after permitting the generation voltage control, the generation permission determination circuit 54 is determined to perform the energization stop to the field winding 22 as the prohibiting state of the generation voltage control. After that, when determining that the system power source is on, the generation permission determination circuit 54 determines to perform the initial excitation control as the prohibiting state of the generation voltage control.

According to this configuration, at the communication failure time with the engine controller 42, when prohibiting the generation voltage control after permitting the generation voltage control, it once transits to the energization stop state to the field winding 22. Since the energization stop to the field winding 22 is the initial state where the generator 2 does not generate electricity actively; in the case where the rotational speed of the engine 4 drops by some factor and the engine starting failure occurs, the state of the generator 2 can once be transited to the initial state on the safe side. Then, in the case where it is determined that the system power source is on, the initial excitation control is started as the usual procedure, and detectability of the rotational speed of the generator is made more reliable, start determination of the generation voltage control by the rotational speed of the generator can be ensured.

In the case where the signal wire, which inputs the on-off information (potential) of the system power source switch 44b into the generation permission determination circuit 54, does not disconnect, after prohibiting the generation voltage control, the initial excitation control is started immediately. That is to say, in the case where the signal wire of the ignition switch 44 is normal and it is determined that the system power source is on, when prohibiting the generation voltage control, the initial excitation control is performed.

2. Embodiment 2

Next, the generator controller 1 according to Embodiment 2 will be explained. The explanation for constituent parts the same as those in Embodiment 1 will be omitted. Embodiment 2 is different from Embodiment 1 in that the generation permission determination circuit determines using first and second determination values at communication failure time in the case of the communication failure time.

Figure 5:
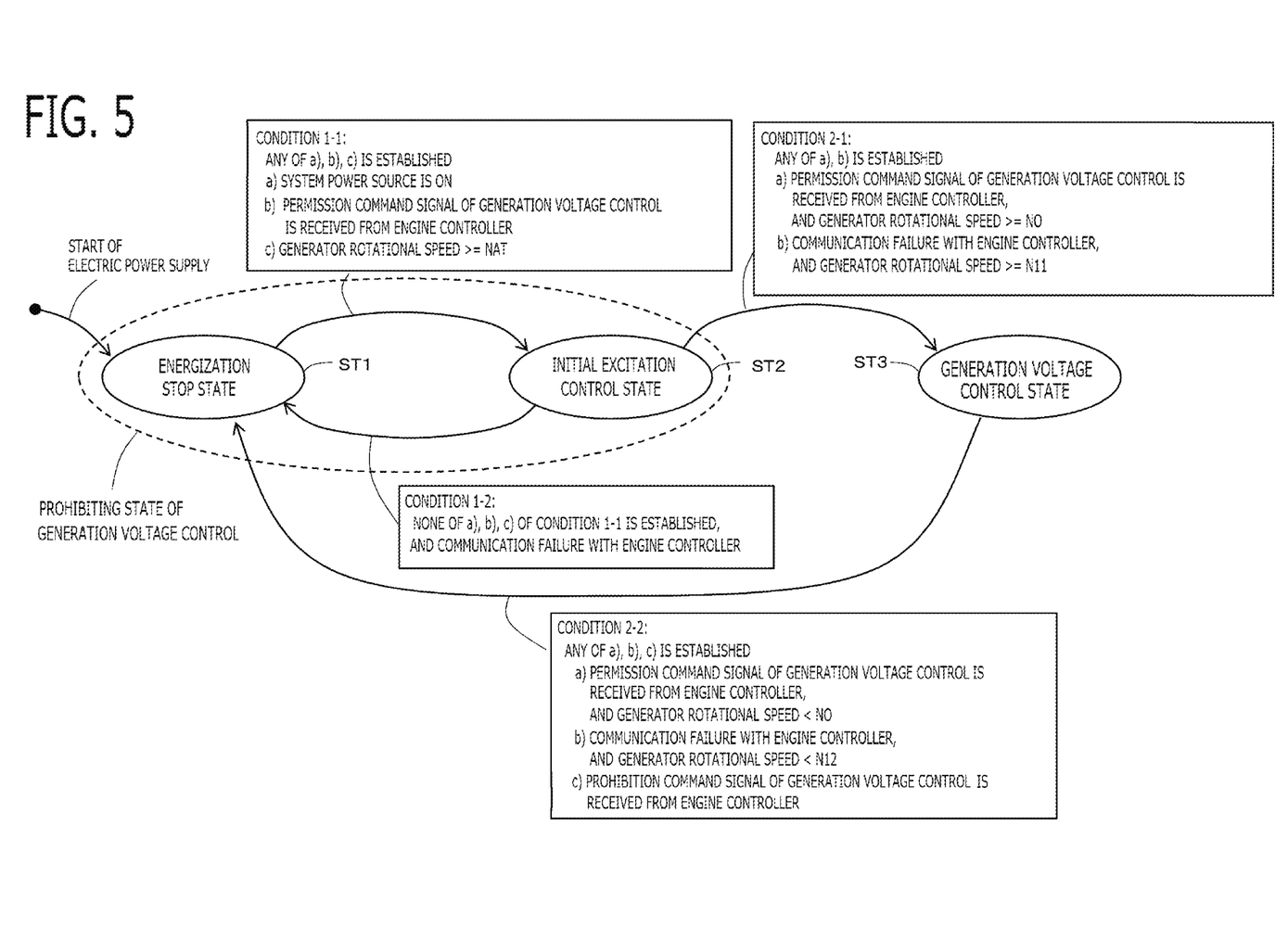
FIG. 5 is a state transition diagram for explaining the processing of the generator controller according to Embodiment 2.

In the present embodiment, as shown in the state transition diagram of FIG. 5, since other than b) of the condition 2-1 and b) of the condition 2-2 are similar to the state transition diagram of FIG. 2 of Embodiment 1, explanation will be omitted.

In the present embodiment, the condition 2-1 for transiting to the generation voltage control state ST3 from the initial excitation control state ST2 consists of a) the communication circuit 52 can communicate with the engine controller 42 and receives the command signal of permission of the generation voltage control from the engine controller 42, and the rotational speed of the generator is greater than or equal to the determination value at communication normal time NO, and b) the communication circuit 52 cannot communicate with the engine controller 42, and the rotational speed of the generator is greater than or equal to a first determination value at communication failure time N11; and the condition 2-1 is established in a case where any of a), b) is established. The first determination value at communication failure time N11 is set to a value higher than the determination value at communication normal time NO.

In the present embodiment, the condition 2-2 for transiting to the energization stop state ST1 from the generation voltage control state ST3 consists of a) the communication circuit 52 can communicate with the engine controller 42 and receives the command signal of permission of the generation voltage control from the engine controller 42, and the rotational speed of the generator is lower than the determination value at communication normal time NO, b) the communication circuit 52 cannot communicate with the engine controller 42, and the rotational speed of the generator is lower than a second determination value at communication failure time N12, c) the communication circuit 52 can communicate with the engine controller 42, and receives the command signal of prohibition of the generation voltage control from the engine controller 42; and the condition 2-2 is established in a case where any of a), b), c) is established. The second determination value at communication failure time N12 is a value higher than the determination value at communication normal time NO, and is set to a value lower than the first determination value at communication failure time N11.

According to the state transition diagram of FIG. 5, in the case where the communication circuit 52 cannot communicate with the engine controller 42 after the system power source is turned on, when the rotational speed of the generator becomes higher than the first determination value at communication failure time N11 which is set to a value higher than the determination value at communication normal time NO, the generation permission determination circuit 54 permits the generation voltage control; after that, when the rotational speed of the generator becomes lower than the second determination value at communication failure time N12 which is set to a value higher than the determination value at communication normal time NO and a value lower than the first determination value at communication failure time N11, the generation permission determination circuit 54 prohibits the generation voltage control.

Figure 6:
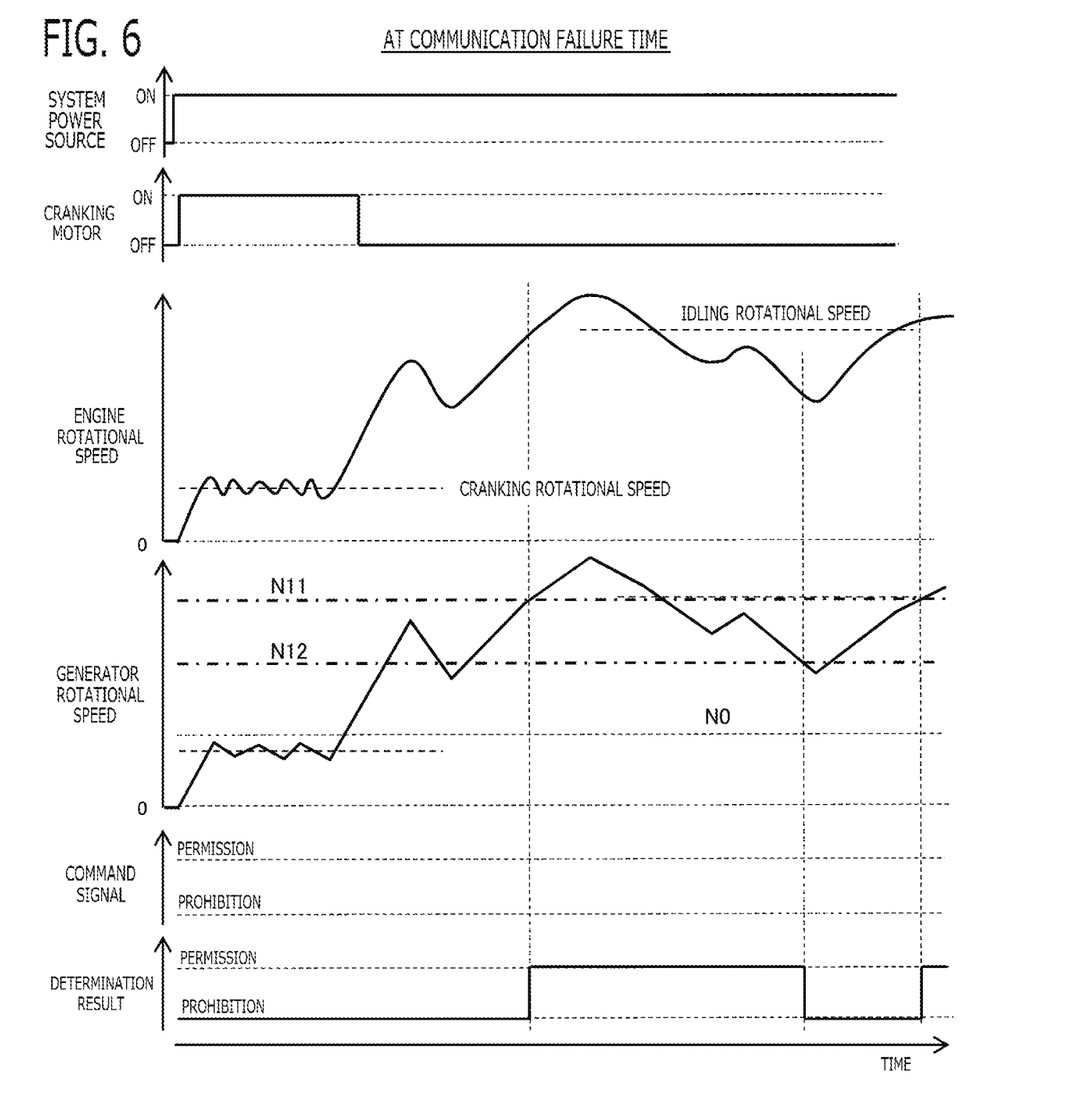
FIG. 6 is a time chart for explaining the control behavior at the communication failure time according to Embodiment 2.

According to this configuration, as shown in the time chart of FIG. 6, in the case where the communication circuit 52 cannot communicate with the engine controller 42 after the system power source is turned on, when the rotational speed of the generator becomes higher than the first determination value at communication failure time N11, the generation permission determination circuit 54 permits the generation voltage control; after that, when the rotational speed of the generator becomes lower than the second determination value at communication failure time N12, the generation permission determination circuit 54 prohibits the generation voltage control.

In the case of the configuration of Embodiment 1, if the first determination value at communication failure time N1 is set to a low value in order to start the generation voltage control in an early stage (for example, 1000 rpm), the rotational speed of the generator may exceed the determination value momentarily by ripple of the engine rotational speed. Since combustion is unstable when the ripple occurs, if the generation voltage control is permitted, drop of the rotational speed may occur and startability may be deteriorated. If the first determination value at communication failure time N1 is set to a high value (for example, 2500 rpm) as a countermeasure against the ripple, deterioration of startability can be suppressed, but permission period of the generation voltage control decreases and generation efficiency is deteriorated.

According to the configuration of the present embodiment, as shown in the time chart of FIG. 6, by setting the first determination value at communication failure time N11 for permitting the generation voltage control to a high value, even if the ripple of engine rotational speed occurs, the generation voltage control cannot be permitted and deterioration of startability can be suppressed. For example, the first determination value at communication failure time N11 is preliminarily set to a value (for example, 2500 rpm) according to the rotational speed of the generator corresponding to the engine idling rotational speed.

On the other hand, if the rotational speed of the generator rises to the first determination value at communication failure time N11, after that, in the state of continuing the generation voltage control, startability is not deteriorated even though the rotational speed drops slightly. However, if the rotational speed drops too much in the state of continuing the generation voltage control, drop of the rotational speed may occur and startability may be deteriorated. According to the configuration of the present embodiment, since the generation voltage control is prohibited when the rotational speed of the generator becomes lower than the second determination value at communication failure time N12, deterioration of startability can be suppressed. On the other hand, in the case where the rotational speed of the generator is between the first determination value at communication failure time N11 and the second determination value at communication failure time N12, since the generation voltage control is permitted, decrease of the permission period of the generation voltage control is suppressed, and deterioration of generation efficiency can be suppressed. For example, the second determination value at communication failure time N12 is preliminarily set to a value (for example, 1500 rpm) lower than the rotational speed of the generator corresponding to the engine idling rotational speed.

Therefore, according to the present embodiment, even if the ripple of engine rotational speed occurs, the generation voltage control is not permitted and deterioration of startability can be suppressed. After permitting the generation voltage control, even if the engine rotational speed drops, the generation voltage control is continued within a range where startability is not deteriorated, and deterioration of generation efficiency can be suppressed.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the ignition switch 44 provided with the system power source switch 44b and the cranking motor power switch 44c is provided, and the generation permission determination circuit 54 determines whether or not the system power source was turned on by the terminal voltage of the system power source switch 44b. However, embodiments of the present disclosure are not limited to the foregoing case. That is to say, other kinds of ignition switches such as a start push button type or a remote control type ignition switch, may be provided; in this case, based on other information such as the terminal voltage of the system power source relay, it may be determined whether or not the system power source was turned on.

(2) In each of the above-mentioned Embodiments, there been explained the case where as the prohibiting state of the generation voltage control, the energization stop state ST1 and the initial excitation control state ST2 are provided. However, embodiments of the present disclosure are not limited to the foregoing case. That is to say, either one of the energization stop state ST1 or the initial excitation control state ST2 may be provided as the prohibiting state of the generation voltage control.

(3) In each of the above-mentioned Embodiments, there has been explained the case where in the case where the condition 2-2 is established, it transits from the generation voltage control state ST3 to the energization stop state ST1, after that, it transits to the initial excitation control state ST2. However, embodiments of the present disclosure are not limited to the foregoing case. That is to say, in the case where the condition 2-2 is established, it may transit from the generation voltage control state ST3 to the initial excitation control state ST2 directly.

(4) In each of the above-mentioned Embodiments, there has been explained the case where the field current control unit, the communication unit, the rotational speed detection unit, and the generation permission determination unit are configured by respective circuits 51 to 54. However, embodiments of the present disclosure are not limited to the foregoing case. That is to say, respective units of the generator controller 1 may be configured by an arithmetic processor (computer) such as CPU (Central Processing Unit), storage apparatuses such as ROM (Random Access Memory) and RAM (Read Only Memory), input and output circuit, a communication circuit, and the like. The arithmetic processor may execute the program stored in the storage apparatus such as ROM, and collaborate with other hardware, so that the functions of respective units is realized.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A generator controller which controls a generator generating electricity by a rotational driving force of an engine, the generator controller comprising:
   a communication circuit that receives a command signal of permission or prohibition of a generation voltage control from an engine controller which controls the engine;
   a rotational speed detection circuit that detects a rotational speed of the generator;
   a generation permission determination circuit that, when the communication circuit can communicate with the engine controller after a system power source is turned on, permits the generation voltage control when the command signal of permission of the generation voltage control is received from the engine controller and the rotational speed of the generator is higher than a normal determination value, and prohibits the generation voltage control when the command signal of prohibition of the generation voltage control is received from the engine controller or when the rotational speed of the generator is lower than the normal determination value, and
   the generation permission determination circuit, when the communication circuit cannot communicate with the engine controller after the system power source is turned on, permits the generation voltage control when the rotational speed of the generator is higher than a failure determination value which is set to a value higher than the normal determination value, and prohibits the generation voltage control when the rotational speed of the generator is lower than the failure determination value; and
   a field current control circuit that in a case where the generation permission determination circuit permits the generation voltage control, performs the generation voltage control which controls on/off of energization to a field winding of the generator so that a generated voltage of the generator approaches a target voltage, and in a case where the generation permission determination circuit prohibits the generation voltage control, stops the generation voltage control.

2. The generator controller according to claim 1, wherein the normal determination value is a rotational speed of the generator corresponding to a cranking rotational speed of the engine by a cranking motor, and
   wherein the failure determination value is a rotational speed of the generator corresponding to a rotational speed of the engine after an engine startup process has completed and is a higher rotational speed than the normal determination value.

3. The generator controller according to claim 1, wherein the engine controller controls on/off of energization to a cranking motor, and
   wherein the failure determination value is a rotational speed higher than the rotational speed of the generator corresponding to a rotational speed of the engine at which the engine controller turns off the energization to the cranking motor.

4. The generator controller according to claim 1, wherein when the communication circuit cannot communicate with the engine controller after the system power source is turned on, the generation permission determination circuit permits the generation voltage control when the rotational speed of the generator becomes higher than a first failure determination value which is set to a value higher than the normal determination value and the generation permission determination circuit prohibits the generation voltage control when the rotational speed of the generator becomes lower than a second failure determination value which is set to a value higher than the normal determination value and a value lower than the first failure determination value.

5. The generator controller according to claim 1, wherein the generation permission determination circuit, after starting electric power supply to the generator controller, performs an energization stop to the field winding to prohibit voltage generation, and the generation permission determination circuit performs an initial excitation control to prohibit voltage generation when determining that the system power source was turned from off to on, and
   wherein the field current control circuit turns off the energization to the field winding when the generation permission determination circuit performs the energization stop, and controls on/off of the energization to the field winding with a preliminarily set ON duty ratio when the generation permission determination circuit performs the initial excitation control.

6. The generator controller according to claim 1, wherein when the communication circuit cannot communicate with the engine controller, the generation permission determination circuit performs an energization stop to the field winding to prohibit voltage generation when the rotational speed of the generator becomes lower than the failure determination value after permitting the generation voltage control, and the generation permission determination circuit performs an initial excitation control to prohibit voltage generation when determining that the system power source is turned from off to ON, and
   wherein the field current control circuit turns off the energization to the field winding when the generation permission determination circuit performs the energization stop, and the field current control circuit controls on/off of the energization to the field winding with a preliminarily set ON duty ratio when the generation permission determination circuit performs the initial excitation control.

7. The generator controller according to claim 1, wherein the engine controller determines permission or prohibition of the generation voltage control based on a rotational speed of the engine after starting the engine by a cranking motor and transmits the command signal to the generator controller.

* * * * *